No. 715,451. Patented Dec. 9, 1902.
F. ABORN.
APPARATUS FOR FACILITATING DRAWING.
(Application filed June 1, 1897.)
(No Model.) 2 Sheets—Sheet 1.
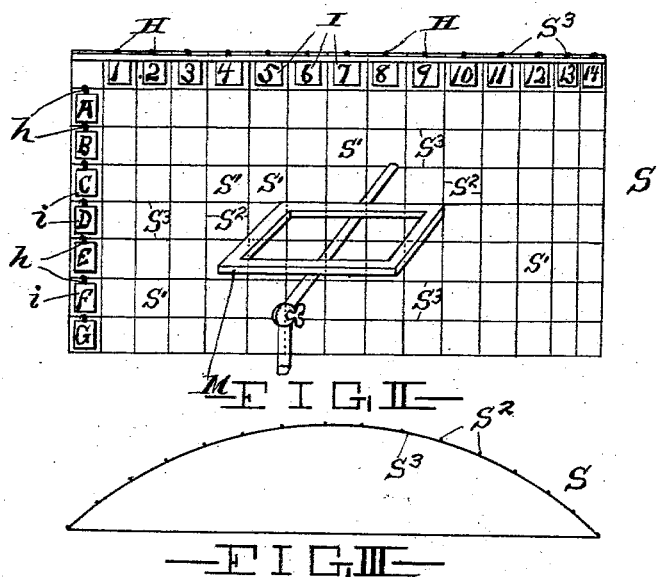
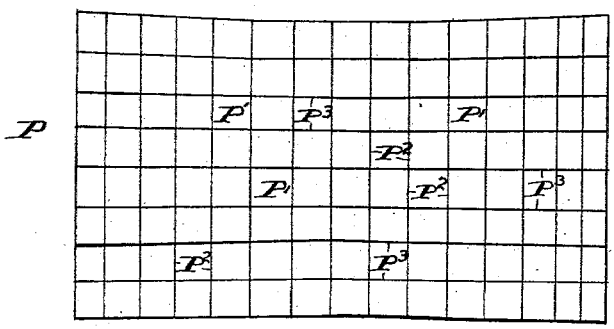
WITNESSES:
Ella E. Silden
L. Ward Hoon
INVENTOR
Frank Aborn
BY
Lynch, Dorer & Donnelly
his ATTORNEYS No. 715,451. Patented Dec. 9, 1902.
F. ABORN.
APPARATUS FOR FACILITATING DRAWING.
(Application filed June 1, 1897.)
(No Model.) 2 Sheets—Sheet 2.
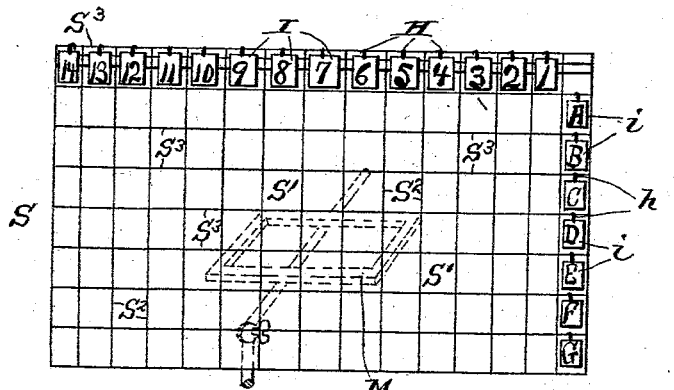
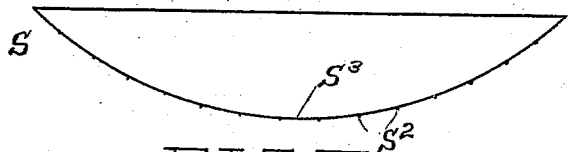
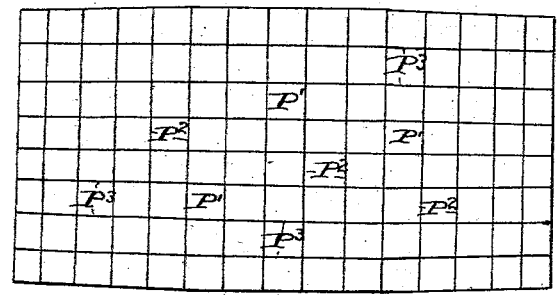

UNITED STATES PATENT OFFICE.

FRANK ABORN, OF CLEVELAND, OHIO.

APPARATUS FOR FACILITATING DRAWING.

SPECIFICATION forming part of Letters Patent No. 715,451, dated December 9, 1902.

Application filed June 1, 1897. Serial No. 638,957. (No model.)

*To all whom it may concern:*

Be it known that I, FRANK ABORN, of Cleveland, Cuyahoga county, Ohio, have invented certain new and useful Improvements in Apparatus for Facilitating Drawing; and I do hereby declare the following to be a full, clear, and exact description of the invention, such as will enable others skilled in the art to which it pertains to make and use the same.

My invention relates to improved apparatus for teaching or facilitating drawing; and it involves, essentially, an upright screen before or behind which and in suitable proximity thereto is placed the model or object to be drawn, which screen has its face divided by eye-guiding lines into eye-guiding spaces, upon or against which the model or object placed before or behind the screen has its outline or the principal points of its outline projected; and the invention comprises, furthermore and essentially, a plane of delineation—a tablet, card, or sheet of paper—that is provided with eye-guiding lines or spaces whose arrangement upon said plane correspond relatively to the arrangement of lines and spaces formed upon the face of the aforesaid screen, and hence an accurate observation as to the lines and spaces against which the outline or the principal points of the outline of the model or object to be drawn are projected will enable or at least facilitate the pupil or student to make an accurate picture of said model or object upon his plane of delineation, which plane he has before him upon the desk or table at which he is employed. It will readily be observed that the pupil or student having the model's outline or the principal points of said outline located upon the screen and having the average capacity of observing correctly can by transferring or marking said outline or points of outline upon correspondingly relatively arranged lines and spaces of his plane of delineation make an accurate drawing or picture of said model or object.

In the accompanying drawings, Figure I is an elevation of the concave side of a concavo-convex screen that forms in the case illustrated a member of my improved apparatus that is employed, as already indicated, to facilitate making a correct drawing of any selected model or object. Fig. II is a top plan of the same. Fig. III shows a plane of delineation that is employed with the position of the screen shown in Figs. I and II. Fig. IV is an elevation of the convex or opposite side of said screen. Fig. V is a top plan relative to Fig. IV. Fig. VI shows the plane of delineation that is used with the position of the screen shown in Figs. V and VI.

In Fig. I a model M whose outline or picture is to be drawn upon the plane of delineation P (shown in Fig. III) is shown placed before and in suitable proximity to the screen S. In Fig. IV the model is shown beyond the screen. I would here remark that the model is placed before or behind the screen, according as the concave side or the convex side of the screen faces the point of view. The model shown is a quadrangular frame, and the screen has the curvature required to enable its eye-guiding spaces S' to be seen from different points in the seating-space of a school-room without materially foreshortening from any one of the points of view the spaces upon or against which the outline of the model is projected. The screen is preferably transparent and in the case illustrated is composed of strands of wire and comprises two suitably interlocked or interwoven series of strands of wire. The wires $S^2$ of one of the series of wires are parallel and extend vertically across the screen, and the wires $S^3$ of the other series of wires extend from left to right across the screen, and the said arrangement of wires form the quadrangular spaces S', that together with the lines formed by the wires have projected upon or against them the outline or principal points of the outline of the model to be drawn, and consequently facilitate, in connection with the plane of delineation, the drawing of an accurate outline or picture of said model upon said plane of delineation. To facilitate the reading of the spaces or lines upon which or against which the outline of the model is projected, I index the horizontal and vertical rows of spaces formed upon the screen. For instance, as shown in Fig. I, the vertical rows of spaces are numbered 1 2 3, &c., and the horizontal rows of spaces are lettered A B C, &c. Each number, mark, or character of the index for the vertical rows of spaces is placed, preferably, upon a card I, that is removably suspended, by means of a hook H, from the uppermost horizontal wire above that vertical row of spaces that is indicated by the said number, mark, or character. Each letter, mark, or character of the index for the horizontal rows of spaces is preferably made upon a card $i$, that is removably suspended, preferably by means of a hook $h$, from the horizontal wire at the top of the horizontal row of spaces that is indicated by said letter, mark, or character, and the letters, marks, or characters of the index of the horizontal rows of spaces are located, preferably, at one end of the screen in a vertical row. Removably suspending or supporting the said cards renders them reversible, so that they can be used in both positions of the screen.

The plane of delineation that is employed in combination with the screen and forms a member of my improved apparatus consists, preferably, of a central photographic or perspective front view of the screen with the latter's indexes removed—that is, the plane of delineation of the apparatus illustrated has parallel perpendicular lines $P^2$ and lines $P^3$, extending from left to right across the perpendicular lines, and has said lines so arranged as to form upon said plane quadrangular spaces $P'$, whose arrangement upon said plane corresponds relatively to the arrangement of spaces $S'$ seen upon the face of the screen.

The plane of delineation shown in Fig. III is a perspective central front view of the screen when the latter's concave side faces the point of view, and the plane of delineation illustrated in said figure consequently coöperates in drawing or sketching with the screen's position shown in Figs. I and II.

The plane of delineation shown in Fig. VI is a central front perspective view of the screen when the latter's convex side faces the point of view, and consequently the plane of delineation shown in said Fig. VI coöperates in drawing or sketching with the screen's position shown in Figs. IV and V.

By the hereinbefore-described method and coöperating devices the pupil or student is greatly assisted in acquiring the art of correctly drawing or sketching. The object or model that is to be sketched and that is placed in front of or behind the screen hides or is partially hid by certain eye-guiding lines and spaces or portions of said lines and spaces of the screen and the juxtaposition of the screen to the model or object enables the pupil or student to observe readily the portions of the screen that are thus hid or instrumental in hiding and enables him to quickly locate upon his plane of delineation the essential points of the outline of the object, and consequently enables him to readily draw a silhouette of the object, because all the pupil or student has to do is to observe closely the different parts of the object or model as he sees them relative to the screen. For instance, in making a drawing of the quadrangular frame, as shown in Fig. I, which frame is the model in the case illustrated, a pupil or student who sees said model, as shown in Fig. I, observes that the upper left-hand external corner of said frame is projected against the lower right-hand corner of the quadrangular space $S'$, that is located in the screen's row 5 of the vertical rows of spaces and found in row C of the screen's horizontal rows of spaces. He then accurately marks or indicates the said point upon his plane of delineation and then proceeds to locate the remaining essential points of the outline of the said frame in the same manner and his drawing upon the plane of delineation will be accurate if the outline's essential points marked upon certain spaces and lines of the plane of delineation have their relative location upon said plane corresponding with the relative location of the corresponding points projected against the screen.

The curvature of the screen in top plan or horizontal section is an essential feature of my invention, because it renders a copy of one and the same plane of delineation suitable for any pupil in the school-room wherein my improved apparatus is employed. If the screen was not curved, as indicated, the pupils in each section of the room would require a plane of delineation different from the plane of delineation required by pupils in other sections of the school-room. The plane of delineation in order to render it suitable for carrying out my invention should be a front view of the screen in perspective, looking at the central portion of the screen. In this view the larger eye-guiding spaces appear centrally of the plane of delineation. So far as each pupil in the school-room is concerned the larger eye-guiding spaces upon the screen are those that are directly in front of him. It is obvious that the curved form of the screen will cause the eye-guiding spaces viewed by each pupil in the school-room to have the same relative size and arrangement as the eye-guiding spaces viewed by every other pupil in the school-room, and when each pupil is instructed to draw the points of the object to be drawn that are projected against the eye-guiding spaces that appear largest to him upon the correspondingly-larger eye-guiding spaces upon his plane of delineation every pupil in the school-room can use a facsimile of this plane of delineation and draw an accurate or approximately-accurate picture of the object.

My invention comprises broadly, therefore, an upright screen concave or convex in plan or horizontal section and provided upon its front side or face with eye-guiding lines, marks, or characters.

What I claim is—

1. A device for teaching drawing, comprising an upright screen that is curved in horizontal section, and has its front side provided with eye-guiding lines, marks or characters, substantially as and for the purpose set forth.

2. A device for teaching drawing, comprising an upright screen that is curved in horizontal section and has its front side provided with eye-guiding lines, marks or characters, in combination with a plane of delineation provided with lines, marks or characters having their relative arrangement upon the plane corresponding with the relative arrangement of the lines, marks or characters of the screen.

3. A device for teaching drawing, comprising an upright screen that is curved in horizontal section and has its front side provided with eye-guiding lines, marks or characters, in combination with a plane of delineation bearing a front perspective view of the screen's lines, marks or characters.

4. An upright screen curved in horizontal section and having its front side divided into spaces bounded by lines for guiding the eye and facilitating the drawing of the outline of an object that is placed before the screen, and has its configuration projected against the screen.

5. A device for teaching drawing, comprising an upright screen curved in horizontal section and having its front side provided with lines or characters to guide the eye, in combination with a plane of delineation bearing a central front perspective view having lines or characters corresponding to those upon the screen.

In testimony whereof I sign this specification, in the presence of two witnesses, this 21st day of May, 1897.

FRANK ABORN.

Witnesses:
C. H. DORER,
ELLA E. TILDEN.